(12) United States Patent
Kolbenschlag

(10) Patent No.: US 10,234,051 B2
(45) Date of Patent: Mar. 19, 2019

(54) ELECTROPNEUMATIC MAGNET VALVE

(71) Applicant: SAMSON AKTIENGESELLSCHAFT, Frankfurt (DE)

(72) Inventor: Stefan Kolbenschlag, Darmstadt (DE)

(73) Assignee: SAMSON AKTIENGESELLSCHAFT, Frankfurt (DE)

( * ) Notice: Subject to any disclaimer, the term of this patent is extended or adjusted under 35 U.S.C. 154(b) by 0 days.

(21) Appl. No.: 15/481,840

(22) Filed: Apr. 7, 2017

(65) Prior Publication Data

US 2017/0292624 A1 Oct. 12, 2017

(30) Foreign Application Priority Data

Apr. 7, 2016 (DE) .................. 10 2016 106 411

(51) Int. Cl.
*F16K 31/06* (2006.01)
*F16K 31/08* (2006.01)
(Continued)

(52) U.S. Cl.
CPC .......... *F16K 31/06* (2013.01); *F16K 31/0606* (2013.01); *F16K 31/0631* (2013.01); *F16K 31/082* (2013.01); *F16K 31/086* (2013.01); *B60T 8/36* (2013.01); *F15B 13/00* (2013.01); *F15B 13/043* (2013.01); *F16K 31/0655* (2013.01); *Y10T 137/8667* (2015.04)

(58) Field of Classification Search
CPC .. F16K 31/06; F16K 31/0606; F16K 31/0631; F16K 31/082; Y10T 137/8667
See application file for complete search history.

(56) References Cited

U.S. PATENT DOCUMENTS 4,311,280 A * 1/1982 Knape ............... F02M 51/0685
239/585.2
8,282,071 B2 * 10/2012 Tabelander ............... F15B 9/09
251/129.04

(Continued)

FOREIGN PATENT DOCUMENTS

| DE | 19636207 A1 | 8/2000 |
| DE | 102007030405 B3 | 10/2008 |
| DE | 102008063339 A1 | 2/2010 |

*Primary Examiner* — Craig Schneider
*Assistant Examiner* — Kevin Barss
(74) *Attorney, Agent, or Firm* — Schiff Hardin LLP

(57) ABSTRACT

An electropneumatic magnet valve for a pneumatically actuated field device can include a valve member, an electromagnetic controller, a magnet valve member, and an activator. The valve member can be moveable between at least two operating positions for ventilating and/or exhausting a magnet valve exit. The electromagnetic controller can move the valve member between the operating positions. The magnet valve member operator can move, additionally with respect to the electromagnetic controller, the valve member independently of an operation of the electromagnetic controller. The valve member operator can include an activator to selectively generate/provide a magnetic field for contact free operation of the valve member via which the magnet valve member operator is changeable between a passive operating condition and an active operating condition.

18 Claims, 6 Drawing Sheets

(51) Int. Cl.
    *B60T 8/36* (2006.01)
    *F15B 13/00* (2006.01)
    *F15B 13/043* (2006.01)

(56) References Cited

U.S. PATENT DOCUMENTS

| | | | |
|---|---|---|---|
| 8,310,231 B2* | 11/2012 | Lee | G01N 24/08 |
| | | | 324/307 |
| 2005/0030136 A1* | 2/2005 | Babich | H01F 3/02 |
| | | | 335/220 |
| 2010/0224810 A1 | 9/2010 | Bakke et al. | |
| 2012/0153633 A1* | 6/2012 | Kolbenschlag | F16K 37/0033 |
| | | | 290/1 A |

* cited by examiner

ELECTROPNEUMATIC MAGNET VALVE

CROSS REFERENCE TO RELATED APPLICATIONS

This patent application claims priority to German Patent Application No. 102016106411.4, filed Apr. 7, 2016, which is incorporated herein by reference in its entirety.

BACKGROUND

The disclosure relates to an electropneumatic magnet valve, such as an electropneumatic transducer for setting and dispensing a pneumatic dispensing signal for and to an electropneumatic field device, such as a pneumatic drive, of a processing field device, such as a final control device or positioner. Such an electropneumatic magnet valve can particularly be also called I/P-transducer. The electropneumatic magnet valve is deployed for the pneumatically actuated field device, particularly a positioner, of a processing plant, such as a chemical plant, a petrochemical plant, a food processing plant, such as a brewery, a power plant or the like.

An example electropneumatic solenoid or magnet valve is described in German Patent document DE 196 36 207 C2. The electropneumatic transducer is formed with a flapper plate held axially and radially by a spring. The flapper plate releases or closes air guiding channels in a valve-like manner. The flapper plate will be operated during normal operation of the magnet valve by an electropneumatic control device in the form of a coil inherent to the magnet valve, the coil displacing the flapper plate against the axial bias of the spring when supplied with electrical current. Generally, this electromagnetic magnet valve has proven itself in processing technology, however, in the area of a processing technology there is a general desire to verify the functional operability of an electropneumatic magnet valve before its assembly, in particular before its electrical connection for normal operation.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

Figure 1:
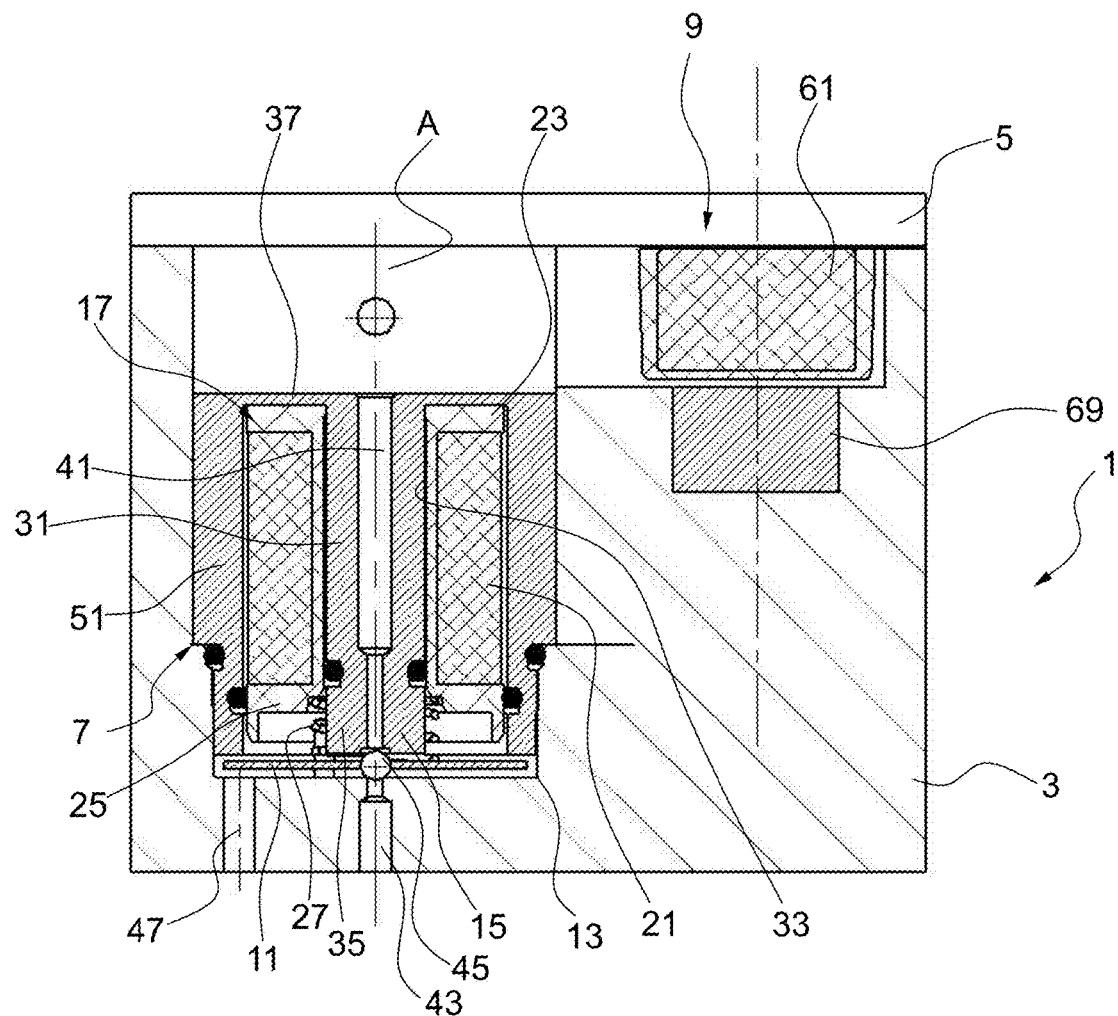
FIG. 1 illustrates a cross sectional view of a solenoid valve according to an exemplary embodiment of the present disclosure in which a permanent magnet is in a passive operating condition.

The exemplary embodiments of the present disclosure will be described with reference to the accompanying drawings.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring embodiments of the disclosure.

It is an objective of the disclosure to overcome the disadvantages of the prior art, and in particular to be able to examine an electropneumatic magnet valve regarding its particularly complete functional operability, without having to fully complete the assembly, in particular the electric assembly, of the magnet valve on the processing field device, wherein in particular the multitude of the components of the unmounted magnet valve to be examined shall be examinable as simple as possible even by unskilled personal, in particular most of all without electrical energization of the coil. In particular, the flapper plate shall be actuatable without negatively effecting the technical surrounding of the magnet valve.

Accordingly, an electropneumatic magnet valve is provided for a pneumatically actuated field device, in particular, a positioning device for a positioner or final control device, of a processing plant, such as a chemical plant, a petrochemical plant, a food processing plant, such as a brewery, a power plant or the like.

The electropneumatic magnet valve according to the disclosure comprises a magnetisable valve member, such as a flapper plate. In an exemplary embodiment, the magnetisable valve member and flapper plate include the magnetisable valve member and flapper plate as described in German Patent document DE 196 36 207 C2, but is not limited thereto.

In an exemplary embodiment, the valve member is configured to be moveable between at least two operating positions. Therefore, the valve member can be borne or guided for following a predetermined control path, in particular translationally or rotationally, on a magnet valve housing. Also, a spring actuated forced displacement can be attributed to the valve member. Furthermore, the electropneumatic solenoid or magnet valve having an electromagnetic control device, such as an inductivity, such as a coil, for electrically generating and communicating displacement forces to the valve member in order to move the valve member between the at least two operating positions, in particular relative to the above-mentioned valve channels. In an exemplary embodiment, the valve member, the valve member in combination with the electropneumatic control device and possibly a valve member guide has two operating positions defined stationary with respect to the magnet valve housing, in particular a ventilating position in which a pneumatic magnet valve exit is ventilated with a pneumatic control signal which in particular by the respective position of the valve member can be set according to its strength, and an operating condition, in which the pneumatic magnet valve exit is exhausted.

In an exemplary embodiment, the electropneumatic magnet valve has an independent separate valve member operator in relation to the electromagnetic control device, such a manually operable valve member operator, which works independently in relation to the generation of driving forces acting upon the valve member and/or in relation to causing and transferring the driving forces to the valve member. In an exemplary embodiment, this additional valve member operator is configured, regarding its operation, independent of the operation of the electromagnetic control device, such that the valve member can be positioned and driven independently of the electromagnetic control device, in particular the energization of the control device (e.g. during turned-off electrical supply of the control device) and between the at least two predetermined operating positions. In an exemplary embodiment, the additional valve member operator is allowed to operationally function due to a corresponding safety mechanism, exclusively when the electromagnetic control device is inactive, in particular the coil thereof being de-energized. In an exemplary embodiment, a safety device is additionally provided which prohibits any change of the valve member operator into its active state, for instance via the activation mechanism, when the electromagnetic control device is operationally and functionally operated, in particular the coil thereof being electrically energized.

In one or more exemplary embodiments, with the valve member operator, it is possible to examine the functional operability of the mechanics for holding and moving the valve member between the at least two operating positions. In an exemplary embodiment, the valve member operator has a static permanent magnetic field, for example a permanent magnet, or an electro magnet, for a contact-free actuation of the valve member and for communicating magnetic actuating forces to it to thereby cause the movement of the valve member. In an exemplary embodiment, the valve member operator has an activation mechanism (e.g., an activator) to trigger or end the examination-operation of the valve member according to a time and/or a position of the valve member. Via the activation mechanism, the valve member operator, in particular the magnetic field, shall be moveable between a passive operating condition, in which the valve member remains unaffected/unmoved by the permanent magnet, and an active operating condition, in which the valve member exclusively because of a magnetic force, is moveable from an in particular forced operating condition into a further operating condition. In the passive operating condition, into which the activation mechanism can switch or bring the permanent magnet, the magnetic field may very well remain active, however, it is in this passive operating condition not sufficient to displace the valve member. In the active operating condition, the activation mechanism succeeds in that the magnetic field of the additional valve member operator is configured as such that, in particular being strong enough and/or essentially directly oriented towards the valve member so that the valve member is moved out of an operating position, in particular to the valve channels.

In an exemplary embodiment, the magnetic field can be generated by a permanent magnet, which for example can be formed by one piece of magnetic hard material. In an exemplary embodiment, alloys of iron, cobalt, nickel and/or suitable ferrites can be selected for materials of the permanent magnet. In an exemplary embodiment, the magnetic field can additionally or alternatively be generated by an electromagnet or an electric current which may be realized by electricity supply inherent to the magnet valve, or be externally introduced into separate connections relative to the electromagnetic control device. In an exemplary embodiment, a permanent magnet is used through which the displacement-magnetic-field is generated even before the electrical assembly connection.

Through the contact-free operation by means of the magnetic field, cut-outs for a mechanical axis to the valve member are dispensable. The same applies to seals which would have to interact with the mechanical axis components.

In an exemplary embodiment, the activation mechanism is a switching device, such as a switch-off and/or switch-on-device which actively generates and turns off the magnetic field. For example, the switching state can be realized by changing or by removing an electric supply, in order to achieve the magnetic effect. An activation mechanism can also be realized in that not only the permanent magnetic effect is generated or turned off, but a static permanent magnetic effect of the valve member can be increased or reduced (e.g., be cancelled or admitted) via kinematic (isolation means) and/or corresponding magnetic isolation means.

With the additional valve member operator, not only the mechanical functional operability of the electropneumatic magnet valve can be examined, by having the valve member operator let the valve member move out of one of its operating positions; also the application of the magnetic field allows an examination of a mechanical/pneumatically functional operability of the magnetic valve during the operational operation thereof by means of the electromagnetic control device. According to the disclosure, a comprehensive functional examination of the electropneumatic valve member is achieved which utilises an electromagnetic control device.

In an exemplary embodiment, the activation mechanism comprises a displacement mechanism configured to move the magnetic field, in particular the permanent magnet, to move it relative to the valve member. The magnetic field can achieve the active and passive operation state in relation to its magnetic influence on the valve member. In an exemplary embodiment, the displacement mechanics or device can define at least one displacement end stop position, preferably two displacement end stop positions between which the magnetic field is moveable. In an exemplary embodiment, one displacement end position is associated with the passive operating condition while the other displacement end position is associated with the active operating condition. In one displacement end position, the magnetic field is arranged particularly close enough to the valve member to be operated so that the latter can be moved exclusively under the influence of the applied magnetic field of the permanent magnet. In an exemplary embodiment, the valve member can in particular be realized as a stroke closure member or pivotable closure member so that it can be either raised or pivoted in order to be moved between the at least two operating positions. Depending on the displacement path, the magnetic field is set into its active operating condition. In an exemplary embodiment, the displacement device configured to move the magnetic field can comprise a pivoting axis particularly being arranged stationary relative to a housing of a magnet valve. Around this pivoting axis, the magnetic field can be pivotable relative to the at least one displacement end position. In an exemplary embodiment, the displacement device comprises a magnetic field guide so that the magnetic field is moveable between the at least two displacement end positions along a defined guiding path. Thereby, the magnetic field can be guided either translationally or rotationally or in a combined movement between the two displacement end positions. For a precise definition of the displacement end position, a displacement end stop can be provided in the displacement direction to define each respective displacement end position.

In an exemplary embodiment, the fixation of a permanent magnet for generating the magnetic field in both respective positions can particularly exclusively occur using the magnetic field inherent to the permanent magnet. In the active position, the permanent magnet is held in the position centrally relative to a core structure surrounded by the coil of the electromagnetic control device because the stationary magnetic soft core structure of the electromagnetic, preferably passive, control device is attracted by the moveable magnet and it is thereby held in this position. In the passive position, the permanent magnet can be held also because of its magnetic force, by fixing an additional magnetic soft, magnetic hard or permanent magnetic component being fixed in the passive position, stationary on the housing of the magnet valve and wherein the permanent magnet and the component mutually attract one another.

In an exemplary embodiment, the activation mechanism comprises a magnetic field shielding for blocking and/or deflecting/detouring the magnetic field. In an exemplary embodiment, the magnetic field shielding shall either locally bundle or concentrate the magnetic field lines such that the effect of the magnetic field/the magnetic actuating forces onto the valve member are increased in comparison to the passive operating condition, or be detoured and shielded such that the influence of the magnetic field reduces, decreases or cancels the magnetic field force onto the valve member in particular relative to the active operating condition. In an exemplary embodiment, the magnetic field shielding can have the function that the magnetic field of the valve member operator does not disturb further electropneumatic or electromagnetic or other electrical elements of the electropneumatic magnet valve. In an exemplary embodiment, the magnetic field shielding is locally associated to the magnetic field such that it is partially blocked and/or detoured for the passive- or active-operating condition relative to the valve member. In the passive operating condition, for example the magnetic field shielding can shield and/or detour the magnetic field in relation to the valve member such that a movement of the valve member under the influence of the readily existing magnetic field is avoided. The magnetic field force, however, does not suffice to move the valve member or even reaches the valve member. In the active operating condition, the magnetic field shielding leaves the magnetic field so unaffected or can deflect/concentrate it towards the valve member such that the valve member can be moved in particular exclusively under the influence of the magnetic field.

In an exemplary embodiment, the magnetic field shielding is moveable mounted relative to the magnetic field, in particular a permanent magnet. For this, a displacement mechanism of the magnetic field shielding can be provided on the magnet valve. In an exemplary embodiment, the magnetic field shielding shall be operable from the outside of the magnet valve, in particular manually. In an exemplary embodiment, a reception for the magnetic field shielding is provided adjacent to the permanent magnet. In the reception, the magnetic field shielding can be firmly attached on the magnet valve, in particular to an outside of a magnet valve housing. In an exemplary embodiment, when occupying the reception with the magnet valve shielding, this operation is achieved, and when releasing the reception by removing the magnetic field shielding, the active operating condition is achieved. In an exemplary embodiment, the reception is realized as an opening being essentially complementarily shaped to the magnetic field shielding, particularly being arranged on the outside of the magnet valve housing. In an exemplary embodiment, the magnetic field shielding is formed as a kind of encapsulating structure, in order to nearly fully surround the permanent magnet, however this may be shaped. In an exemplary embodiment, one side of the permanent magnet is free in order to achieve an insertion or extraction movement of the shielding out of this side. In an exemplary embodiment, the reception is adapted and shaped to a particularly annular (e.g., circular) magnetic field shielding such that the magnetic field shielding is held in the reception without any further fastening means exclusively under the influence of its gravitational force and the magnetic holding force of the magnetic field (e.g., permanent magnet) arranged stationary with respect to the magnet valve housing. In an exemplary embodiment, the magnetic field shielding is combined with a guiding device holding the shielding in a moveable manner so that the magnetic field shielding is moveable from a storage position into a shielding position. In the storage position, the positioning of the magnet valve shielding can also be realized on an outside of the magnet valve housing. In the shielding position, the magnetic field can be brought into its passive operating condition.

In an exemplary embodiment, an electropneumatic magnet valve can be provided with a storage position for the moveably mountable magnet field shielding. The storage position being displaced from the shielding position, where in the storage position, the magnetic field is brought into its passive operating condition, and/or in which the storage position the magnetic field shielding leaves the magnetic field particularly of the permanent magnet essentially unaffected so that the magnetic field can utilize its magnetic field forces according to a valve member operation. In particular, the magnet valve is provided with a fastening device for holding the magnetic field shielding preferably in the storage position thereof.

In an exemplary embodiment, the electromagnetic control device of the magnet valve has an electrically energizable coil in particular with a coil channel surrounded by the coil. In an exemplary embodiment, the coil is shaped rotationally symmetrically (e.g., cylindrically). In an exemplary embodiment, the control device has a magnetical soft core structure axially and radially surrounding the coil, in which the coil channel lies. In an exemplary embodiment, the core structure includes a coil inwardly core and a coat surrounding the coil. In the axial direction adjacent to the coil front side facing away from the valve member, a front side or front face is connected to this coat and core, structurally coupling them, in order to axially cover the coil. On the side facing the valve operator (the valve operator side), a hollow space is axially open between the core structure and the coat for receiving the coil.

In an exemplary embodiment, the core structure including the inner core and the outer core as well as the valve operation side face wall has a valve member side, particularly being axially open for introducing the coil. With the core structure on the side of the valve member operator, the strength of the front wall is significantly smaller than that of the remaining part, in particular of the interior core and of the outer coat, in order to achieve a concentration of bundling of the magnetic field of the centrically arranged magnetic field for valve member operations such that by means of a magnetic saturation on the front end wall, magnetic field lines are concentrated in the inner core axially parallel to the axial direction towards the valve member. With the valve member particularly being realized as a flapper plate, the magnetic field is closed on the core structure which is open towards the valve member on its valve member side when the valve member is moved towards or engaged with the front side of the core structure.

In an exemplary embodiment, the electromagnetic control device (anchor of the coil) and the core structure can form the magnetic actor of the electropneumatic control device. The core structure with the coil form a stationary part of the flapper plate with a ball pressed into it from the moveable valve member parts. When the electromagnetic control device is energized, magnetic forces occur which attract the valve member in the direction of the core structure. An air gap or air slot present in the non-actuated state between the iron core and the valve member and formed by a spring acting into the valve member, is decreased until the valve member engages a ventilation or exhaust seat of the magnet valve housing. A narrow air gap is desired even after the magnetic attraction, so that the flapper plate does not adhere to the core structure due to small amounts of residue magnetization. A quasi-closed magnetic field circuit is realized.

In an exemplary embodiment, the electromagnetic control device is electrically isolated against the core structure by means of an isolation body or winding form (for example of plastic material). In an exemplary embodiment, the valve member can be realized as a float-mounted flapper plate with a centrally arranged ball structure which can sealingly cooperate with the respective ventilation seat.

In an exemplary embodiment, alternatively and additionally, the coil and the core structure can be attached stationarily, immovably relative to the magnet valve housing.

In an exemplary embodiment, the valve member is realized as a moveably mounted flapper valve member formed as a flapper plate, in particular having an axially protruding closure member releasing or occupying one air channel of the magnet valve. In an exemplary embodiment, the closure member can be firmly attached to the flapper plate, in particular in its centre. The flapper valve member can be arranged axially offset relative to an axis of the coil from a frontal coil end facing towards the valve member. In an exemplary embodiment, the magnetic field is stationarily defined on a coil end diametrically opposite to the coil end on the flapper member side, in particular the permanent magnet being fastened to the magnet valve housing, in particular a displacement end position of the moveable permanent magnet being provided.

In an exemplary embodiment, the core structure forms a frontal wall on the magnetic field side covering the adjacent axial end of the coil, to which a front wall, in particular an inner core, extending through the coil channel of the coil can connect integrally or as a separate piece. The coil wall is preferably inserted into a circumferential axial material weakening or clearance, in particular a preferably annular recess.

In an exemplary embodiment, the front side itself can comprise a wall thickness which is suitable to influence the field lines in order to generate a magnetic saturation in the area of the front wall through which a concentration of the magnetic field is achieved towards the inner core and thus to the valve member. Through the magnetic saturation in the area of the front side, field lines cannot run on a direct path towards the opposing pole of the magnet but are forced to a detour through the (thicker) inner core towards the valve member. The bundled field line forces cause an attraction of the valve member with the aim to close the air gap. The material weakening on the face side or the smaller frontal wall thickness should be selected such that the magnetic circuit is not impaired during coil operation. The axial strength of the front side should not be smaller than the smallest axial cross section of the valve member. Because even without weakening the front side, a very strong magnetic field can move the flapper plate. Then, however, a significantly stronger magnet would be required.

In an exemplary embodiment, the material clearance in the front side serves to bundle or to concentrate the field lines of the magnetic field with respect to their path towards the valve member. Thereby, the material clearance and the core structure defining the material clearance can be configured such that in the active operating condition of the magnetic field, the field lines thereof are deflected towards the valve member so that, in the active operating condition, the valve member, preferably a flapper valve member, is magnetically attracted to an end stop structure on the valve-member-side. Upon stop or impact, a ventilation- or exhaust-channel formed in the core structure shall be closed by the valve member, in particular the closure member thereof. In an exemplary embodiment, the core structure is formed with the inner core extending axially through the coil channel, the inner core being structurally separated through an annular free space in relation to the outer sleeve-shaped coat surrounding the core, in which the coil is arranged. In an exemplary embodiment, the magnetic field lines of the magnetic field, which is arranged distal from the front side of the core structure, are guided via the inner core towards the valve member. The inner core can in particular comprise a counter-flapper-piece extending over the valve-member-side coil end against which the valve member, which is operated against the spring-bias, can engage in order to achieve a defined axial position. In an exemplary embodiment, a ventilation and exhaust-channel is formed in the inner core of the core structure, this channel being able to be closed or released by the valve member.

In an exemplary embodiment, the valve member, in particular the flapper member is forced into a closed- or released-position, in particular being biased by a spring element. In an exemplary embodiment, the spring element is a compression spring particularly supported on the core structure and the valve member. Thereby, the electropneumatic control device and the magnetic valve member actuator or operator for moving the valve member act against the urging force particularly of the spring element which brings the valve member into a forced position. In an exemplary embodiment, the control force direction of the electropneumatic control device and of the further valve member operator are aligned or rectified.

In an exemplary embodiment, the valve member includes a flapper plate with a press-fitted ball and is arranged in a slot-space having an axial slot-size of few millimetres, which can be formed as a hollow space. The hollow space is axially delimited on one side by the magnet valve housing and on the other side by the core structure. The hollow space allows an amplitude of movement of the valve member of, for example, a few millimetres, in particular smaller than 1 cm or 2 cm, in particular orthogonally relative to a flapper valve plate, but is not limited thereto. The hollow space shall on one side be delimited by a core structure of a stator of the electromagnetic control device and on the other side by the housing wall. Thereby, one ventilation channel or exhaust channel can be formed in the core structure and (the other) one exhaust channel or the ventilation channel can be formed in the magnet valve housing wall. The valve member in a first operating condition closes (one of) the ventilation and exhaust channel in the core structure or releases it. In a second, axially offset operating condition relative to the first one of the flapper valve member, the same closure member releases or closes (the other one of) the ventilation and exhaust channel in the magnet valve housing in order to occupy the two fundamental magnet valve switching states, ventilation or exhaust. Self-evidently it shall be clear that in the ventilation switch state different gradients of ventilation can be set.

In an exemplary embodiment, a safety device including an electronic warning signal emitter is provided which turns off the activation mechanism while the electromagnetic control device is operated, in particular while the core thereof is supplied with a current. Alternatively or additionally, the safety device can comprise a position sensor which determines the position of the magnetic field relative to its active operating condition and which determines whether for example a permanent magnet is positioned in the area of the valve member, in order to cause the valve member operation. Alternatively or additionally, a magnetic field sensor can be provided in the area of the electromagnetic control device and/or of the valve member which detects the presence or absence of an admissible or inadmissible magnetic field of the valve member operator. Each respective sensor can be connected to an electronic logic circuit which determines, on the basis of experience values or calibration values or software values, whether the magnetic field is the magnetic field according to the operation, or whether any faulty or undesired magnetic field influences are present. The logic circuit can emit a warning signal or be coupled directly to the position controller in order to cause an emergency switching position.

In an exemplary embodiment, the disclosure relates to an electropneumatic field device, such as a position controller or a pneumatic actuator, of a processing plant. The electropneumatic field device according to the disclosure has at least one electropneumatic solenoid or magnet valve according to the disclosure.

Figure 2:
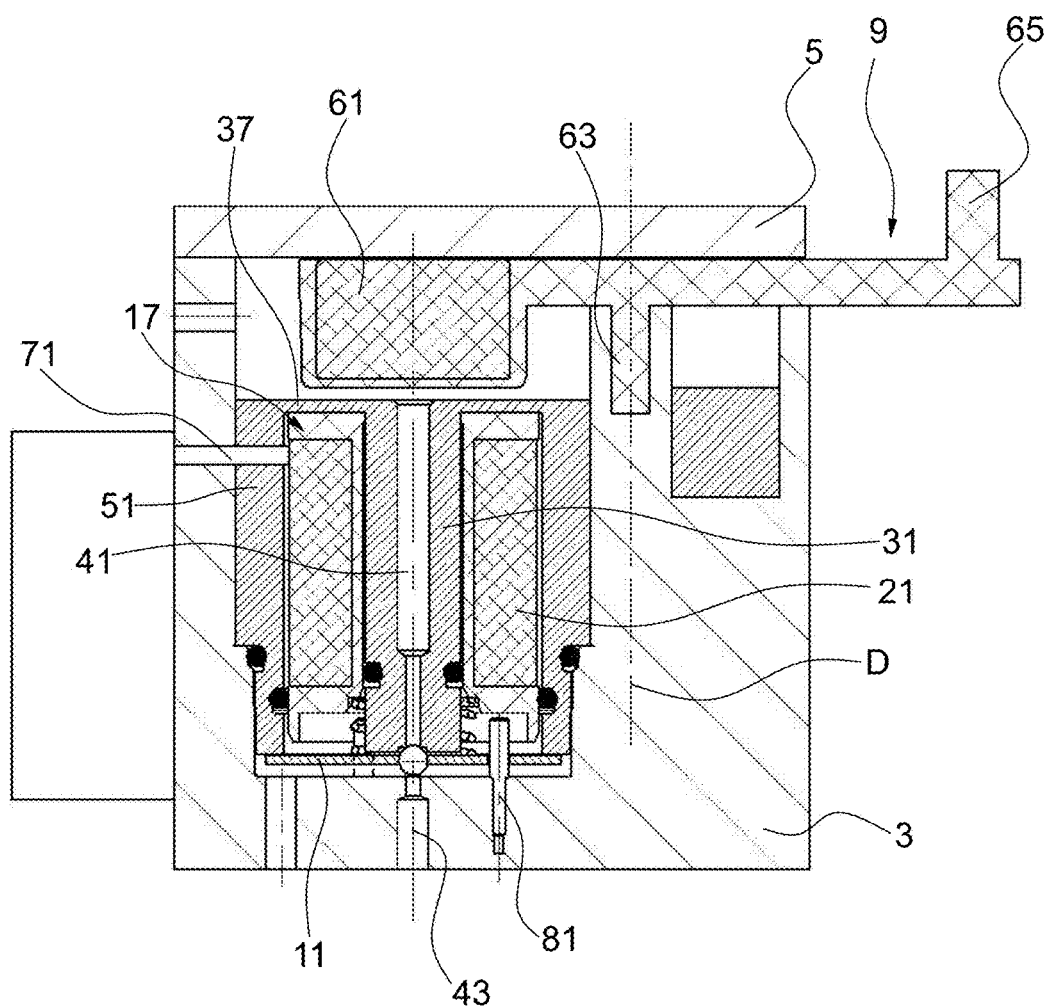
FIG. 2 illustrates a cross sectional view of the solenoid valve according to FIG. 1 in which a permanent magnet is in an active operating condition.
Figure 3:
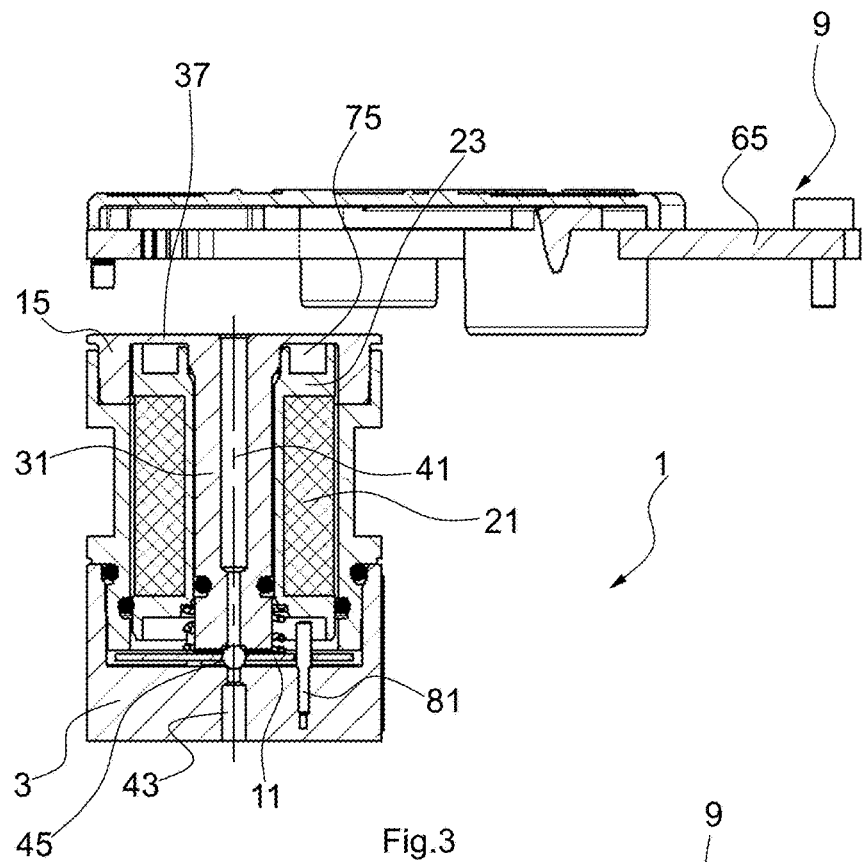
FIG. 3 illustrates a cross sectional view of a solenoid valve according to an exemplary embodiment of the present disclosure where a permanent magnet is in the passive operating condition.
Figure 4:
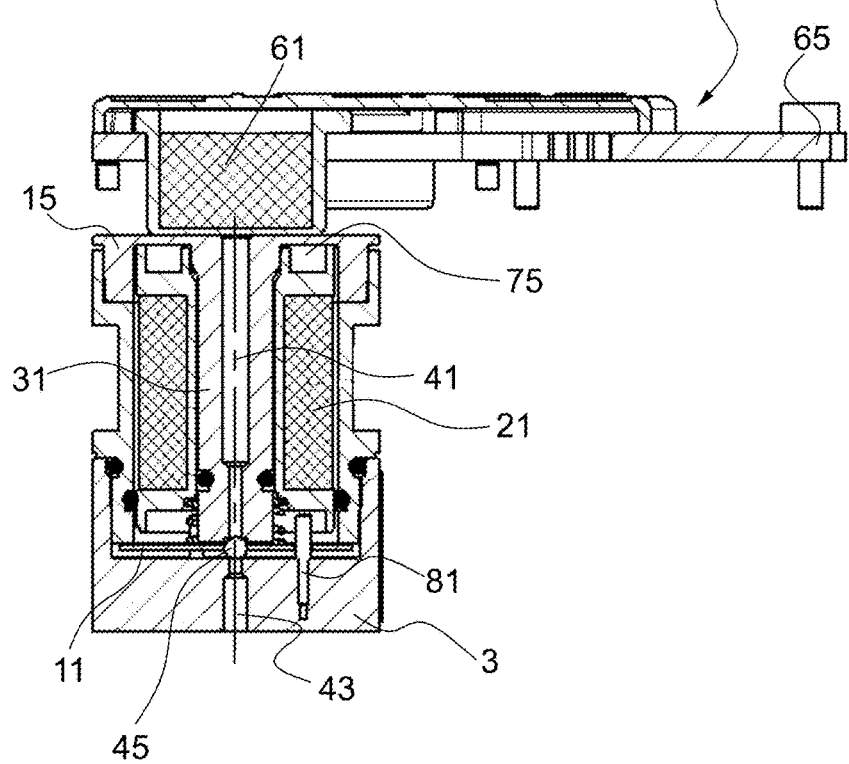
FIG. 4 illustrates a cross sectional view of the valve of FIG. 3 in which a permanent magnet is in an active operating condition.
Figure 5:
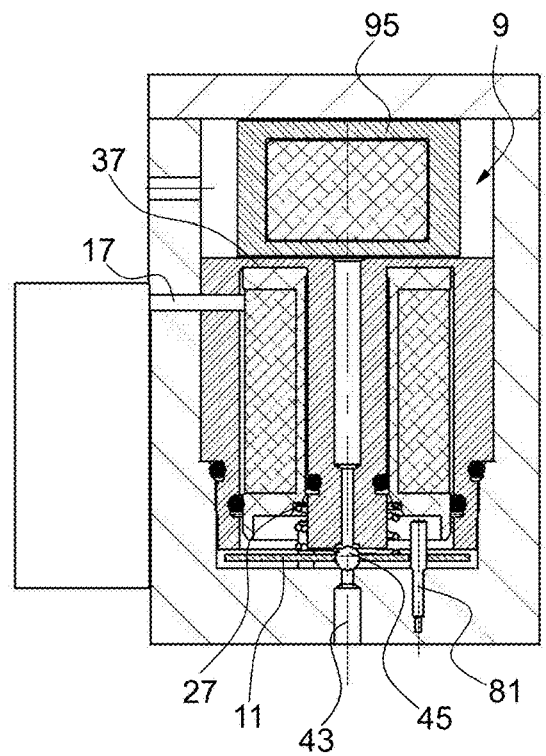
FIG. 5 illustrates a cross sectional view of a solenoid valve according to an exemplary embodiment of the present disclosure where a permanent magnet is in the passive operating condition.
Figure 7:
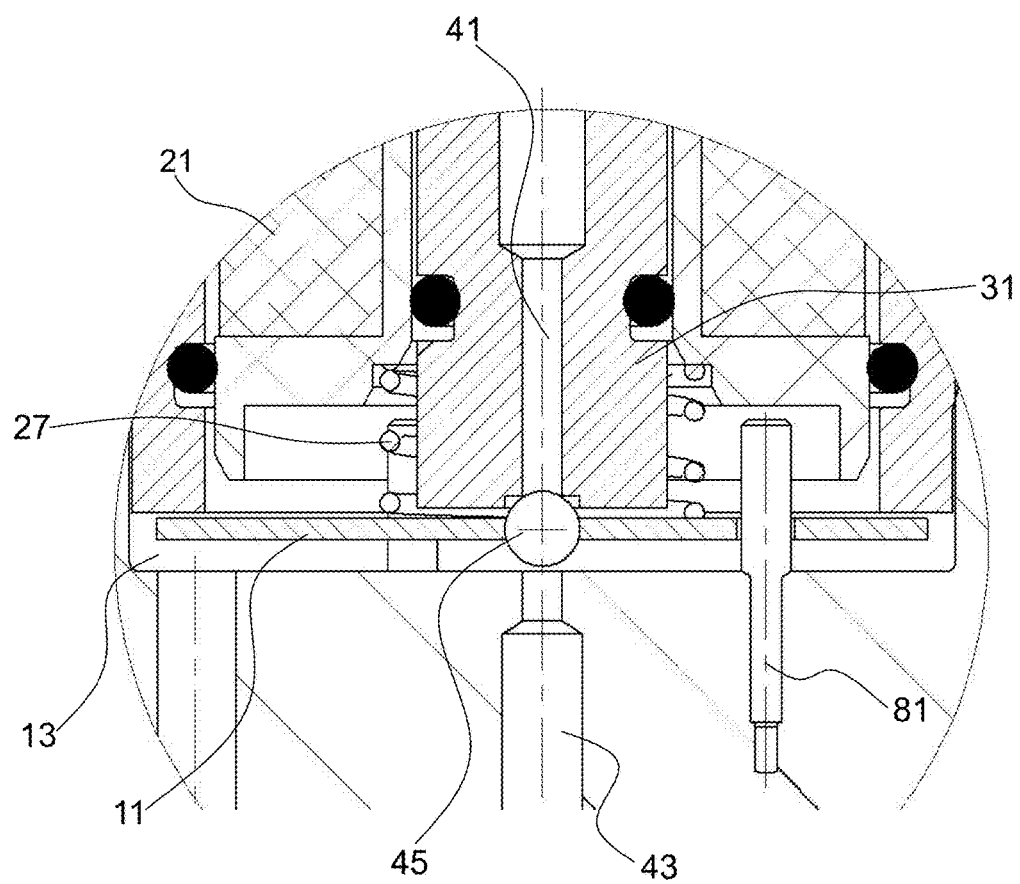
FIG. 7 illustrates a view of the solenoid valve according to an exemplary embodiment of the present disclosure including the moveably mounted valve flapper plate.

With reference to FIGS. 1 and 2 in conjunction with FIG. 7, and also to reference the embodiments of FIGS. 3, 4, 5, and/or 6, exemplary embodiments of an electropneumatic solenoid valve according to the disclosure is generally designated with the reference numeral 1. In an exemplary embodiment, the magnet valve or solenoid valve 1 has, aside from an electromagnetic control device 7, a further manually operable valve member operator 9 which works independently of the electromagnetic control device and which is operated independently therefrom. The valve member operator is magnetic and creates magnetic displacement forces for moving the valve member 11 of the solenoid valve 1. The valve member operator 9 has a magnetic field shown in detail in FIG. 8 with magnetic field lines, and an activation mechanism which is realized in different ways in the embodiments described herein below.

In an exemplary embodiment, the solenoid valve 1 comprises a schematically illustrated housing 3 to which a lid 5 is pivotably mounted.

In an exemplary embodiment, in the housing 3, an electromagnetic control device 7 is stationarily arranged. A valve member moveable in the axial direction A is a flapper plate 11 being moveably mounted in a slot space 13 which is delimited on one side by the inner side of the housing 3 and on the other side by the stationary, magnetic soft core structure 15. The mounting of the flapper plate 11 in the axial direction A is realized with at least one guiding pin 81 which guidingly cooperates with an orifice in the flapper plate 11, forming of a play-fit. Alternatively, the guiding pin can be completely omitted. The core structure 15 encapsulates a coil device 17 essentially completely with a surrounding annular coil 21, and with a coil coat 23 (coil form) which surrounds the coil 21 radially inwardly and on the axial ends thereof, in particular one of a non-metallic material. In the outer coat 51 of the core structure 15, an axis channel 71 is formed through which electric conduits for electrically energizing the coils 21 can run.

On an axial end 25 of the coil coating facing the flapper plate 11, the compression spring 27 supports itself and acts upon the flapper plate 11 in order to urge it into a forced position.

The core structure 15 and the coil device 17 form the actor of the electropneumatic control device 7. In an exemplary embodiment, the core structure 15 comprises an inner core 31 completely extending through the coil channel 33 of the ring core 21 in the axial direction A, namely from one flapper end 35 of the inner core 31 towards a frontal end wall 37 opposite from the flapper plate 11, which fully radially surrounds it. The inner core 31 delimits coaxially to the axial direction A an exhaust channel 41 lying on atmospheric pressure and mounding into the slot space 13. The coil device 17 is radially outwardly completely surrounded by the core structure 15 so that for the particularly cylindrical ring core 21 a complementarily shaped, particularly cylindrical, annular space is realized in which the coil device 17 is inserted particularly from the flapper plate side and sealed via sealing rings.

In an exemplary embodiment, as indicated in FIG. 1, two further channels mound into the slot space 13 in which the flapper plate 15 is moveably mounted. A ventilation channel 43 lies coaxially to the axial direction A and mounds into the slot space 13 in which a ball-shaped closure member 47 being attached to the flapper plate 15 and also being arranged on the axial directional axis A. In an exhaust position, the closure member 45 closes the mounding end or mouth end of the ventilation channel 43; while in a ventilation position, the valve closure member 45 releases the ventilation channel 43 but closes the exhaust channel 41, as shown in FIG. 7.

In an exemplary embodiment, the further described channel is an exhaust channel, dispensing channel or exit channel 47 which is attached to a pneumatically actuated field device, such as a pneumatic actuator, by means of pneumatic lines (not shown in further detail). As indicated in the figures, also the dispensing channel 47 mounds into the slot space 13 so that, depending upon the position of the flapper plate 11 or the closure member 47 thereof, the dispensing channel 47 is pneumatically coupled with at least one of the ventilation channel 43 or the exhaust channel 41.

In an exemplary embodiment, both channels, the ventilation channel 43 as well as the dispensing channel 47, are inserted into the structure of the magnet valve housing 3. The exit channel 47 is always open, independently of the position of the flapper plate 11.

In an exemplary embodiment, with reference to FIGS. 1 and 2, the frontal end wall 37 which is arranged distally from the flapper plate 11 has an axial strength or thickness significantly narrower than the radial sides of the inner core 31 or the outer coat 51 of the core structure 15. The strength (cross sectional area) of the frontal end wall 37 shall not become smaller than the smallest cross section of the flapper plate 11. Alternatively or additionally, the axial strength of the frontal end wall 37 shall significantly be formed smaller than 1 cm, preferably smaller than 5 mm, 2 mm or 1 mm. The frontal end wall 37 is preferably the most narrow wall side of the core structure 15 receiving the coil device 17.

In an exemplary embodiment, as indicated above, the valve member operator can include a magnetic field which shall operate the valve member independent of the electromagnetic control device. For generating the magnetic field, a permanent magnet or an electromagnet can be used. In the embodiments shown in the figures, a permanent magnet 61 is provided. The magnetic field 61 can be actively activated and deactivated by means of solenoid-valve-autarkic energy supply, which, however, is not shown in further detail in the figures.

In an exemplary embodiment, with reference to FIGS. 1 and 2, the permanent magnet 61 has two operating conditions or switch positions, namely a passive operating condition which is shown in FIG. 1, and an active operating condition which is shown in FIG. 2. In order to bring the permanent magnet 61 from the passive position (FIG. 1) into the active position (FIG. 2), a rotation- or pivoting-mechanism is provided particularly between the lid 5 and the solenoid valve housing 3. The rotation-mechanism is pivotally mounted on the solenoid valve housing 3 via a rod 63 and comprises a lever 65 via which the rotation-mechanism can be manually operated and via which the permanent magnet 61 can be pivoted around an axis of rotation D which is arranged parallel to the axial direction A offset in the radial direction. In order to define the permanent magnet 61 in the passive position (FIG. 1), the magnet lies across from a magnetic soft fixation element 69, so that the permanent magnet 61 is held in position under the influence of its magnet attraction forces. These holding forces can easily be overcome by the lever arm 65 in order to pivot the permanent magnet 61 into the active position, as shown in FIG. 2. In this active position, the permanent magnet 61 lies diametrically on the opposing side of the flapper plate 11 in axial proximity of the weakened front end wall 37 of the core structure 15. In this active position, the permanent magnet 61 is "actuated or switched active" and operates the flapper plate 11 magnetically, contact-free by attracting the magnetized core structure 15 in particular of the inner core 37, as shown in FIGS. 2 and 7.

In an exemplary embodiment, the frontal end wall 37 has a material weakening relative to the material strength of the outer coat 51 and the inner core 31 which causes a magnetic saturation S (FIG. 8) in the area of the thinnest frontal end wall 37. The magnetic saturation S causes a bundling of the field lines F in the inner core 31 of the core structure 15 and leads the magnetic forces in a concentrated manner parallel to the axial direction A towards the flapper plate 11 in order to attract or draw this and thus close the exhaust channel 41.

In an exemplary embodiment, with a moveable permanent magnet 61 that can be brought from an active operating condition into a passive operating condition (from FIG. 1 to FIG. 2) by means of an activation mechanism formed as a rotation mechanism, it is possible to create an examinable operating situation very similar to the actual operation of a solenoid valve by which the functional operability of the solenoid valve, in particular of the mechanics thereof, can be examined. With the closes ventilation channel, a desired ventilation of the pneumatic exit channel or dispensing channel 47 can go along and be examined. Thereby, however, not the electromagnetic control device itself has to be used, so that complicated, elaborate electrical connection assembly work is not required. A simple manual operation of the rotation device is all that is necessary in order to examine the functional operability of the solenoid valve 1.

In an exemplary embodiment, the active position according to FIG. 2 is provided with an end stop function in order to form and define a position of the permanent magnet 61 relative to the coil device 17 and in particular to the core structure 15, the particular design of which is responsible to let sufficiently large magnetically operating forces act on the flapper plate 11 in order to examine the operability thereof.

In the embodiment shown in FIGS. 1 and 2, the activation mechanism is formed as a kind of switching mechanism with two switching positions, as indicated in FIGS. 1 and 2, respectively.

Figure 8:
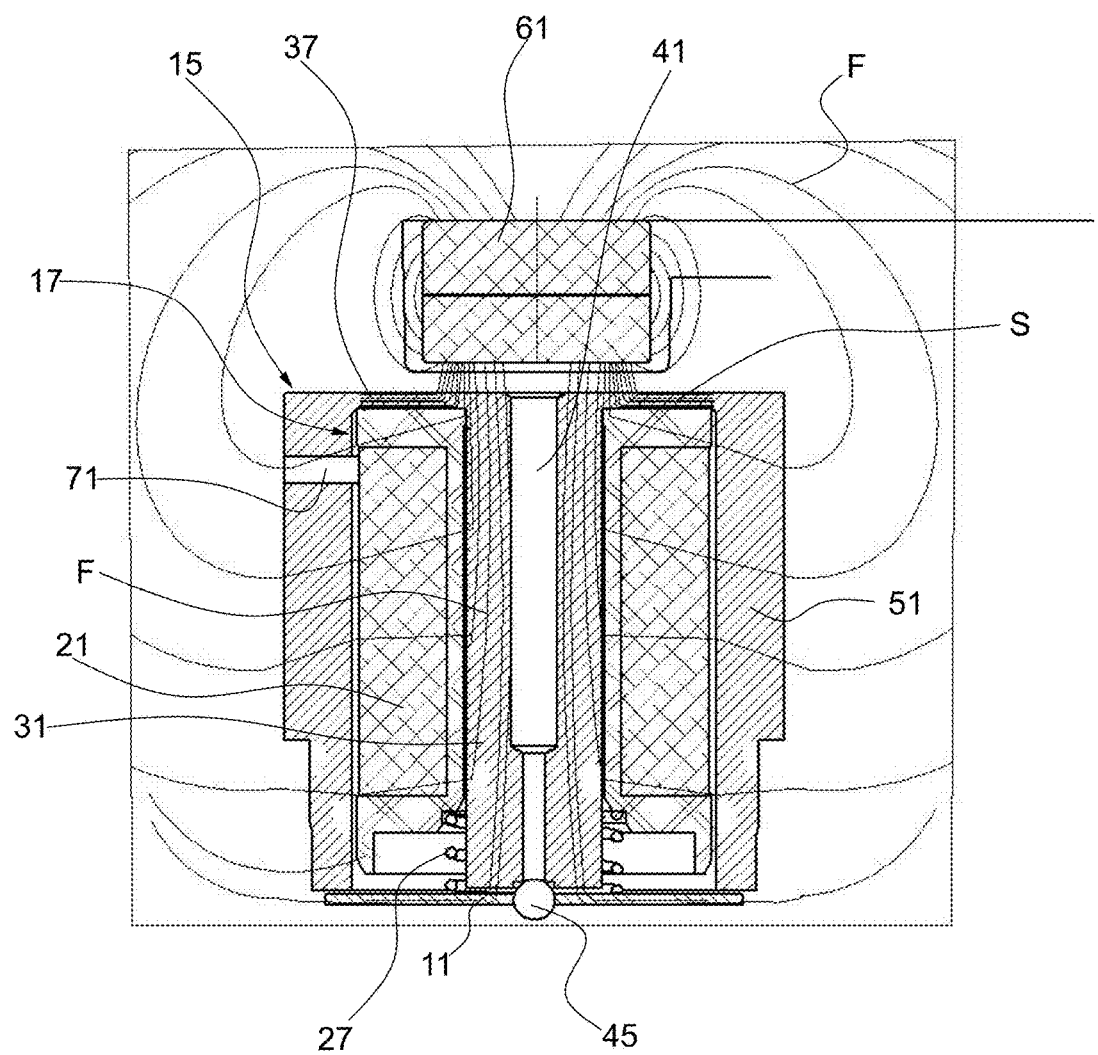
FIG. 8 illustrates a cross sectional view of the valve of FIG. 1 where magnetic field lines are indicated for illustrating the effect of the actuating activation mechanism for a permanent magnet.

FIGS. 3 and 4 illustrate an embodiment of the electropneumatic solenoid valve similar to that of FIGS. 1, 2 and 8, and for the same or similar components of a solenoid valve 1, the same reference numerals are used. The solenoid valve 1 differs from the embodiment according to FIGS. 1, 2 and 8 essentially in the design of the core structure 15, which also comprises a narrow front end wall 37. The coil enclosure is an injection moulded part of a non-conductive material and has an annular orifice 75. The annular orifice 75 serves to receive connector elements for axially connecting to the coil. A magnetic saturation is achieved in the narrow front end wall 37. The magnetic saturation could alternatively also be formed through an annular notch or clearance build in the front end wall 37 with which the desired material weakening can be achieved. In this way, this leads on the narrow front end wall to a concentration of the course of the field lines within the inner core 31 as soon as the permanent magnet 61 is arranged in the active position such as shown in FIG. 4.

In both embodiments according to FIGS. 1, 2, 8 as well as 3 and 4, a guiding mechanism is provided for the translational movement of the flapper plate between the closes position of the ventilation channel 43 and the closed position of the exhaust channel 41, the guiding mean being realized by the guiding pin 81 along which the moveable flapper plate is guided by means of forming and a transition fit or clearance fit.

Figure 6:
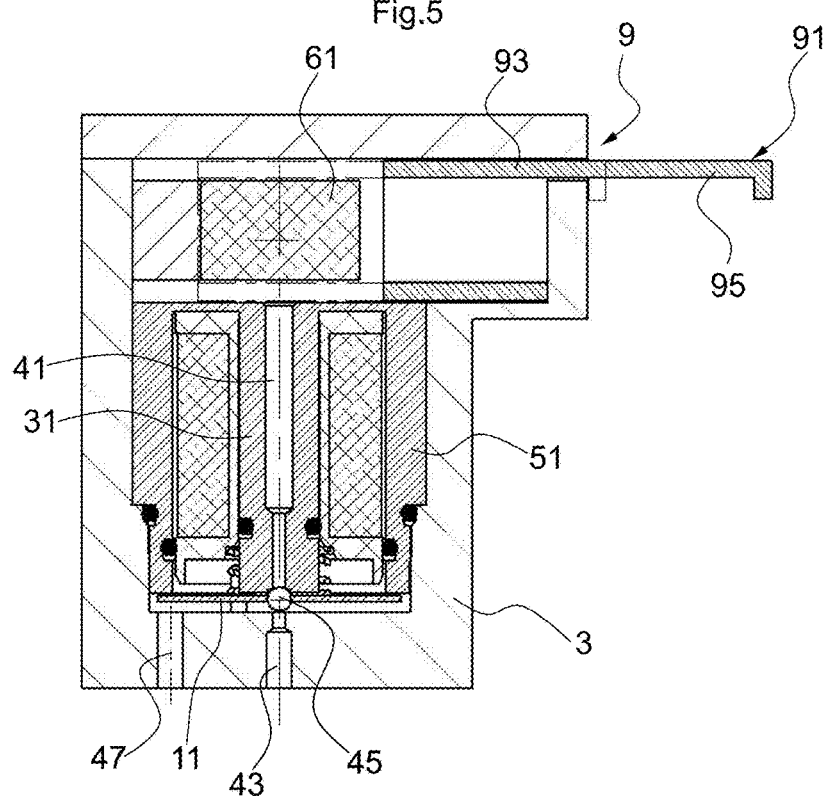
FIG. 6 illustrates a cross sectional view of the valve of FIG. 5 in which the permanent magnet is in an active operating condition.

An exemplary embodiment of the electropneumatic solenoid valve 1 according to the disclosure is shown in FIGS. 5 and 6, wherein for identical and similar components of the above-mentioned embodiments the same or similar reference numerals are used. In the embodiment according to FIGS. 5 and 6, the permanent magnet 61 is not activatable by moving, particularly pivoting, the magnet from an active position into a passive position, rather, the permanent magnet 61 is, as shown in FIGS. 5 and 6, arranged stationarily with respect to the solenoid valve housing 3. In an exemplary embodiment, the electropneumatic solenoid valve 1 nevertheless has an activation mechanism being realized as a magnetic field shielding 91 that may be formed by an encapsulation 93, particularly of a ferrite material, and a slide control lever 95, particularly being integrally formed with the encapsulation 93. The encapsulation 93 can be made of metal and shall completely cover the permanent magnet 61 in particular on its side facing towards the control device 7. Merely on the side of the permanent magnet 61 via which the shielding is slid, pulled or drawn over the permanent magnet 61 can the permanent magnet remain free. In FIG. 5, the passive operating condition of the permanent magnet 61 is shown, because the ferrite-ring-like-encapsulation 93 surrounds the permanent magnet 61 so that the magnetic effect, in particular the magnetic effect in the area on the front end wall 37, cannot unfold. The flapper plate 11 is not magnetically attracted so that the compression spring 27 urges the flapper plate 11 against the solenoid valve housing 3 and the closure member 45 pneumatically seals the ventilation channel 43.

In an exemplary embodiment, when the carriage or slide control lever 95 is operated manually by being drawn out in radial direction (perpendicular to the axial direction A), the shielding or cover 93 is drawn from a permanent magnet 61 so that the permanent magnet 61 can unfold its pneumatic influence and a magnetic saturation is achieved, as shown in FIG. 8. This way, the flapper plate 11 will be attracted by the magnetized inner core 31 so that the ventilation channel 41 is closed. By manually simply operating the magnetic field shielding 91, the permanent magnet 61 can be moved from its passive operating condition into its passive operating condition and vice versa.

The embodiment according to the FIGS. 5 and 6 is also advantageous in that the permanent magnet 61 cannot magnetize and negatively influence other electronic components such as a microchip due to the shielding 91 in the passive operating condition which should usually be the normal operating condition of the electropneumatic solenoid valve.

In an exemplary embodiment, when the permanent magnet 61 is deactivated, this means that the cover 93 surrounds the permanent magnet 61 or that the permanent magnet 61 is pivoted into the passive position. The solenoid valve is then switched into its operating position. The coil 21 can be supplied with current or be electrically energized so that the flapper plate 11 is attracted according to the normal condition of the solenoid valve 1. The exhaust channel 41 is closed and the ventilation channel 43 is opened for supply air. A pneumatic connection is present between the ventilation channel 43 and the dispensing channel 47. In contrast, when the coil 21 is not electrically energized, the flapper plate 11 is pushed under the influence of the compression spring 27 against the seat at the magnet housing side so that the ventilation channel 43 becomes closed. In this case a pneumatic connection is present between the dispensing channel 47 and the ventilation channel 41. The solenoid valve is switched into the ventilation state.

The features disclosed in the above description, the figures and the claims can be of relevance for the disclosure and the different embodiments thereof both by themselves as well as in any arbitrary combination thereof.

CONCLUSION

The aforementioned description of the specific embodiments will so fully reveal the general nature of the disclosure that others can, by applying knowledge within the skill of the art, readily modify and/or adapt for various applications such specific embodiments, without undue experimentation, and without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments. Therefore, the specification is not meant to limit the disclosure. Rather, the scope of the disclosure is defined only in accordance with the following claims and their equivalents.

LIST OF REFERENCE NUMERALS 1 electropneumatic magnet valve
3 housing
5 lid
7 electromagnetic control device (electromagnetic controller)
9 valve member operator
11 flapper plate
13 slot space
15 core structure
17 coil device
21 coil
23 coil coat
25 axial end
27 spring
31 inner core
33 coil channel
35 flapper piece
37 front end wall
41 exhaust channel
43 ventilation channel
45 closure member
47 dispensing channel
51 outer coat
61 permanent magnet
63 rod
65 lever
69 fixation element
71 channel
75 annular orifice
83 pin
91 magnetic field shielding
93 magnet valve housing
95 control lever
A axial direction
F field lines
S magnetic saturation

What is claimed is:
1. An electropneumatic magnet valve for a pneumatically actuated field device, comprising:

a valve member configured to be moveable between at least two operating positions for ventilating and/or exhausting a magnet valve exit;

an electromagnetic controller configured to move the valve member between the at least two operating positions; and a magnet valve member operator configured to move, additionally with respect to the electromagnetic controller, the valve member independently of an operation of the electromagnetic controller, the valve member operator including:

an activator configured to selectively provide a magnetic field for contact free operation of the valve member via which the magnet valve member operator is changeable between a passive operating condition and an active operating condition, wherein, in the passive operating condition, the valve member remains unmoved due to the magnet valve member operator, and in the active operating condition, the valve member is moved out of one of the operating positions under the influence of the magnetic field, and wherein the electropneumatic magnet valve further comprises:

a safety device having an electronic warning signal emitter, the electronic warning signal emitter being configured to turn off the activator while the electromagnetic controller is operated;

a position sensor configured to detect the position of the magnetic field and/or of a magnetic field shielding relative to the active operating position thereof; and/or a magnetic field sensor in the area of the electromagnetic controller and/or of the valve member configured to detect the presence or absence of the magnetic field of the valve member operator.

2. The electropneumatic magnet valve according to claim 1, wherein:

the magnetic field is formed by a permanent magnet; and the activator is associated with the permanent magnet and is configured to move the permanent magnet between the passive operating condition and the active operating condition.

3. The electropneumatic magnet valve according to claim 2, wherein:

the permanent magnet is made of a magnetic hard material; and/or is configured to create a static magnetic field.

4. The electropneumatic magnet valve according to claim 1, wherein the activator comprises:

a displacement device configured to move the magnetic field relative to the valve member, the displacement device defining two displacement-end-positions between which the magnetic field can be moved, wherein:

in one of the two displacement-end-positions, the magnetic field moves the valve member, and the displacement device comprises a pivoting axis arranged stationary with respect to a housing of the magnet valve, around which the magnetic field is pivotable in relation to the two displacement-end-positons.

5. The electropneumatic magnet valve according to claim 4, wherein the displacement device comprises:

a magnetic field guide configured to guide the magnetic field translationally or rotationally between the two displacement-end-positions; and a movement end stop configured to define respective ones of the two displacement-end-positions, the movement end stop being formed by an additional magnet attached to a magnet valve housing.

6. The electropneumatic magnet valve according to claim 1, wherein:

the activator comprises a magnetic field shielding configured to selectively block and/or deflect the magnetic field, the magnetic field shielding being associated to the magnetic field such that the magnetic field is blocked and/or deflected in relation to the valve member for the passive or the active operating condition, in the passive operating condition, the magnetic field shielding shields and/or deflects the magnetic field in relation to the valve member such that a movement of the valve member under the influence of the magnetic field is avoided or reduced, and in the active operating condition, the magnetic field is unaffected by the magnetic field shielding and/or the magnetic field shielding detours the magnetic field towards the valve member such that the valve member is moved under the influence of the magnetic field.

7. The electropneumatic magnet valve according to claim 6, further comprising:

a reception for the magnetic field shielding adjacent to a magnetic field generator, upon the magnetic field shielding occupying the reception, the passive operating condition being reached, and upon release from the reception by removal of the magnetic field shielding, the active operating condition being reached, wherein:

the magnetic field shielding is firmly attached to an outside of a magnet valve housing of the magnet valve, and the reception is disposed on the outside of the magnet valve housing and includes an orifice being complementarily shaped to the magnetic field shielding.

8. The electropneumatic magnet valve according to claim 7, wherein the reception is configured in shape to the magnetic field shielding being annularly or circularly shaped such that the magnetic field shielding is held in the reception: without additional mechanical fastening, under the influence of a gravitational force of the magnetic field shielding, and/or of a magnetic holding force of the magnetic field arranged stationary with respect to the magnet valve housing.

9. The electropneumatic magnet valve according to claim 6, wherein the magnetic field shielding is combined with a guiding device via which the magnetic field shielding is moveable from a storage position into a shielding position in which the magnetic field is brought into its passive operating condition.

10. The electropneumatic magnet valve according to claim 6, wherein a storage position is provided for the magnetic field shielding, the storage position being distanced relative to a shielding position in which the magnetic field is brought into the passive operating condition, and/or, in the storage position, the magnetic field is substantially unaffected, wherein the magnet valve is provided with a fastening device configured to hold the magnetic field shielding in the storage positon.

11. The electropneumatic magnet valve according to claim 1, wherein:

the electromagnetic controller comprises: a coil, a coil channel surrounded by the coil, and a magnetically soft core structure axially and radially surrounding the coil; and the coil and the magnetically soft core structure form a magnetic actuator of the electromagnetic controller and/or are arranged stationary relative to a magnet valve housing.

12. The electropneumatic magnet valve according to claim 11, wherein:
the magnetically soft core structure forms a permanent-magnet-facing front end wall covering an axial end of the coil;
a material weakening on the front end wall or the magnetically soft core structure defining the material weakening are configured such that, in the active operating condition, the valve member is magnetically attracted to the valve member facing front end wall of the core structure, against a spring configured to bias the valve member, to close a ventilation channel or exhaust channel formed in the magnetically soft core structure with a closure member of the valve member;
the core structure is formed with an inner core extending axially through the coil channel to which a corresponding counter flapper piece protruding axially over the coil end facing the valve member joins; and
the ventilation channel or the exhaust channel is formed in the inner core and the valve member can close and release the ventilation or exhaust channel.

13. The electropneumatic magnet valve according to claim 1, wherein:
the valve member is formed as a moveably mounted flapper member and/or with an axially protruding closure member releasing or occupying an air channel;
the valve member is arranged axially offset from the coil end relative to a coil axis; and
the magnetic field is arranged stationary on a coil end diametrically opposite from the coil end facing the valve member facing, a displacement end position of the moveable magnetic field being provided.

14. The electropneumatic magnet valve according to claim 1, wherein:
the valve member is biased by a biasing force of a spring into a closing-position or releasing-position;
the electromagnetic controller and the valve member operator for moving the valve member act against the biasing force bringing the valve member into an urged position;
the valve member is moveably guided in a hollow space translationally and orthogonal relative to a valve flapper plate, the hollow space being formed on one side by the core structure of a stator of the electromagnetic controller and on another side by a housing wall, a ventilation-channel or exhaust-channel being formed in a magnet valve housing wall;
the valve member closes or releases the ventilation-channel or exhaust-channel in the core structure in a first operating position, and in a second operating position closes or releases the ventilation-channel or exhaust-channel in the magnet valve housing wall; and
an exit channel is provided for the magnet valve mounding into the flapper slot space and/or being formed in the magnet valve housing.

15. An electropneumatic field device comprising:
a pneumatic drive configured to actuate a control valve; and
the electropneumatic magnet valve according to claim 1.

16. The electropneumatic magnet valve according to claim 1, wherein the pneumatically actuated field device is a positioner of a processing plant.

17. An electropneumatic magnet valve for a pneumatically actuated field device, comprising:
a valve member configured to be moveable between at least two operating positions for ventilating and/or exhausting a magnet valve exit;
an electromagnetic controller configured to move the valve member between the at least two operating positions; and
a magnet valve member operator configured to move, additionally with respect to the electromagnetic controller, the valve member independently of an operation of the electromagnetic controller, the valve member operator including:
an activator configured to selectively provide a magnetic field for contact free operation of the valve member via which the magnet valve member operator is changeable between a passive operating condition and an active operating condition, wherein, in the passive operating condition, the valve member remains unmoved due to the magnet valve member operator, and in the active operating condition, the valve member is moved out of one of the operating positions under the influence of the magnetic field, wherein the activator includes a displacement device configured to move the magnetic field relative to the valve member, the displacement device defining two displacement-end-positions between which the magnetic field can be moved, wherein:
in one of the two displacement-end-positions, the magnetic field moves the valve member, and
the displacement device comprises a pivoting axis arranged stationary with respect to a housing of the magnet valve, around which the magnetic field is pivotable in relation to the two displacement-end-positons.

18. An electropneumatic magnet valve for a pneumatically actuated field device, comprising:
a valve member configured to be moveable between at least two operating positions for ventilating and/or exhausting a magnet valve exit;
an electromagnetic controller configured to move the valve member between the at least two operating positions, the electromagnetic controller including a coil, a coil channel surrounded by the coil, and a magnetically soft core structure axially and radially surrounding the coil, wherein the coil and the magnetically soft core structure form a magnetic actuator of the electromagnetic controller and/or are arranged stationary relative to a magnet valve housing; and
a magnet valve member operator configured to move, additionally with respect to the electromagnetic controller, the valve member independently of an operation of the electromagnetic controller, the valve member operator including:
an activator configured to selectively provide a magnetic field for contact free operation of the valve member via which the magnet valve member operator is changeable between a passive operating condition and an active operating condition, wherein, in the passive operating condition, the valve member remains unmoved due to the magnet valve member operator, and in the active operating condition, the valve member is moved out of one of the operating positions under the influence of the magnetic field.

* * * * *